(12) United States Patent
Bensberg (10) Patent No.: US 12,072,903 B2
(45) Date of Patent: Aug. 27, 2024

(54) DATA MANAGEMENT SYSTEM FOR MANAGING INFERENCES

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/103,870

(22) Filed: Jan. 31, 2023

(65) Prior Publication Data
US 2024/0256560 A1 Aug. 1, 2024

(51) Int. Cl.
G06F 16/00 (2019.01)
G06F 16/25 (2019.01)
G06N 5/04 (2023.01)

(52) U.S. Cl.
CPC ............ *G06F 16/252* (2019.01); *G06N 5/04* (2013.01)

(58) Field of Classification Search
CPC ............... G06F 16/2379; G06F 16/273; G06F 16/24542; G06F 16/1727; G06F 16/21; G06F 16/23; G06F 16/2455; G06F 16/24552; G06F 16/248; G06F 16/282; G06F 16/951; G06F 16/213; G06F 16/24537; G06F 16/24549; G06F 16/93; G06F 16/9024; G06F 40/30; G06F 16/2365; G06F 16/258; G06F 16/367; G06F 18/29; G06F 3/0482; G06F 40/166; G06F 40/279; G06F 40/40; G06F 16/212; G06F 16/2282; G06F 16/245; G06F 16/2465; G06F 16/26; G06F 16/284; G06F 16/288; G06F 16/3329; G06F 16/36; G06F 40/126; G06F 40/205; G06F 40/295; G06F 40/56; G06N 3/08; G06N 20/00; G06N 5/022; G16H 10/00
See application file for complete search history.

(56) References Cited

U.S. PATENT DOCUMENTS

| | | | |
|---|---|---|---|
| 2010/0030725 A1* | 2/2010 | Mendis | G06F 16/9024 707/781 |
| 2011/0276588 A1* | 11/2011 | Moon | G06F 16/90328 707/769 |
| 2019/0325329 A1* | 10/2019 | Rais-Ghasem | G06F 16/9024 |

(Continued)

OTHER PUBLICATIONS

Bensberg, C. et al., U.S. Appl. No. 17/893,592, filed Aug. 23, 2022, entitled "Storing and Querying Knowledge Graphs in Column Stores".

*Primary Examiner* — Shyue Jiunn Hwa (74) *Attorney, Agent, or Firm* — Sterne, Kessler, Goldstein & Fox P.L.L.C.

(57) ABSTRACT

Various embodiments for a data management system for managing inferences are described herein. An embodiment operates by identifying a set of core data stored in a named graph and inferences generated based on the core data. A plurality of logged updates to the core data are detected. A query to execute against the named graph is received, and a signal to update the named graph is detected. At least a subset of the inferences are deleted, and the core data is modified based on the plurality of logged updates. A new plurality of inferences are generated based on the updated data. The query is executed against the named graph with the updated data and the new plurality of inferences, and a result from executing the query is returned.

20 Claims, 6 Drawing Sheets

(56) References Cited

U.S. PATENT DOCUMENTS

2022/0327356 A1\* 10/2022 Rossiello ............... G06N 3/045
2022/0391270 A1\* 12/2022 Gnanasambandam ......................
G16H 20/70

\* cited by examiner

FIG. 1

| | NamedGraph | Subject | Predicate | Object | Inferenced | Action | 214 |
|---|---|---|---|---|---|---|---|
| 1 | NamedGraph1 | Heidelberg | In | Germany | no | | |
| 2 | NamedGraph1 | Germany | In | EU | no | | |
| 3 | NamedGraph1 | London | In | UK | no | | |
| 4 | NamedGraph1 | UK | In | EU | no | DELETE | |
| 5 | NamedGraph1 | Heidelberg | In | EU | yes | | |
| 6 | NamedGraph1 | London | In | EU | yes | | |
| 7 | NamedGraph1 | Munich | In | Germany | no | ADD | |

FIG. 2A

| | NamedGraph | Subject | Predicate | Object | Inferenced | Action |
|---|---|---|---|---|---|---|
| 1 | NamedGraph1 | Heidelberg | In | Germany | no | |
| 2 | NamedGraph1 | Germany | In | EU | no | |
| 3 | NamedGraph1 | London | In | UK | no | |
| 4 | NamedGraph1 | Munich | In | Germany | no | |
| 5 | NamedGraph1 | Heidelberg | In | EU | yes | |
| 6 | NamedGraph1 | Munich | In | EU | yes | |

```
CREATE KNOWLEDGE GRAPH               /-302
 "mySchema"."myGraph";

SELECT "b"."bookTitle" FROM
 SPARQL_TABLE(GRAPH "mySchema"."myGraph"
 QUERY 'SELECT ?byJava
 FROM <myNamedGraph>
 WHERE
 {
   ?java rdfs:label "Java"@en.
   ?influencedByJava dbo:influencedBy+ ?java
 }');

SPARQL(GRAPH "mySchema"."myGraph"
 STATEMENT 'INSERT { wikidata:Java_a
 dbo:ProgrammingLanguage }');
```

```
CREATE KNOWLEDGE GRAPH               /-304
 "mySchema"."myGraphGroup";

SELECT "b"."bookTitle" FROM
 SPARQL_TABLE(GRAPH "mySchema"."myGraphGroup"
 QUERY 'SELECT ?byJava
 FROM <myNamedGraph>
 WHERE
 {
   ?java rdfs:label "Java"@en.
   ?influencedByJava dbo:influencedBy+ ?java
 }');

SPARQL(GRAPH "mySchema"."myGraphGroup"
 STATEMENT 'INSERT GRAPH <myOtherNamedGraph>
 { wikidata:Java_a dbo:ProgrammingLanguage }');
```

```
                                     /-306
SELECT ?byJava
 FROM <mySchema.myGraphGroup.myNamedGraph>
 WHERE
 {
   ?java rdfs:label "Java"@en.
   ?influencedByJava dbo:influencedBy+ ?java
 }
```

DATA MANAGEMENT SYSTEM FOR MANAGING INFERENCES

CROSS-REFERENCE TO RELATED APPLICATIONS

This application is related to U.S. patent application Ser. No. 17/893,592 titled "Storing and Querying Knowledge Graphs in Column Stores" to Bensberg et. al., filed on Aug. 23, 2022, which is herein incorporated by reference in its entirety.

BACKGROUND

Data management is important for every organization. Achieving flexibility in how data can be stored and queried is often as important as making the management of the data simple and cost effective. While combining data stored in different formats can improve flexibility, this flexibility can also provide new challenges in managing the data especially when compared to having all the data stored in a single data format.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Data management is important for every organization. Achieving flexibility in how data can be stored and queried is often as important as making the management of the data simple and cost effective. While combining data stored in different formats can improve flexibility, this flexibility can also provide new challenges in managing the data especially when compared to having all the data stored in a single data format.

Figure 1:
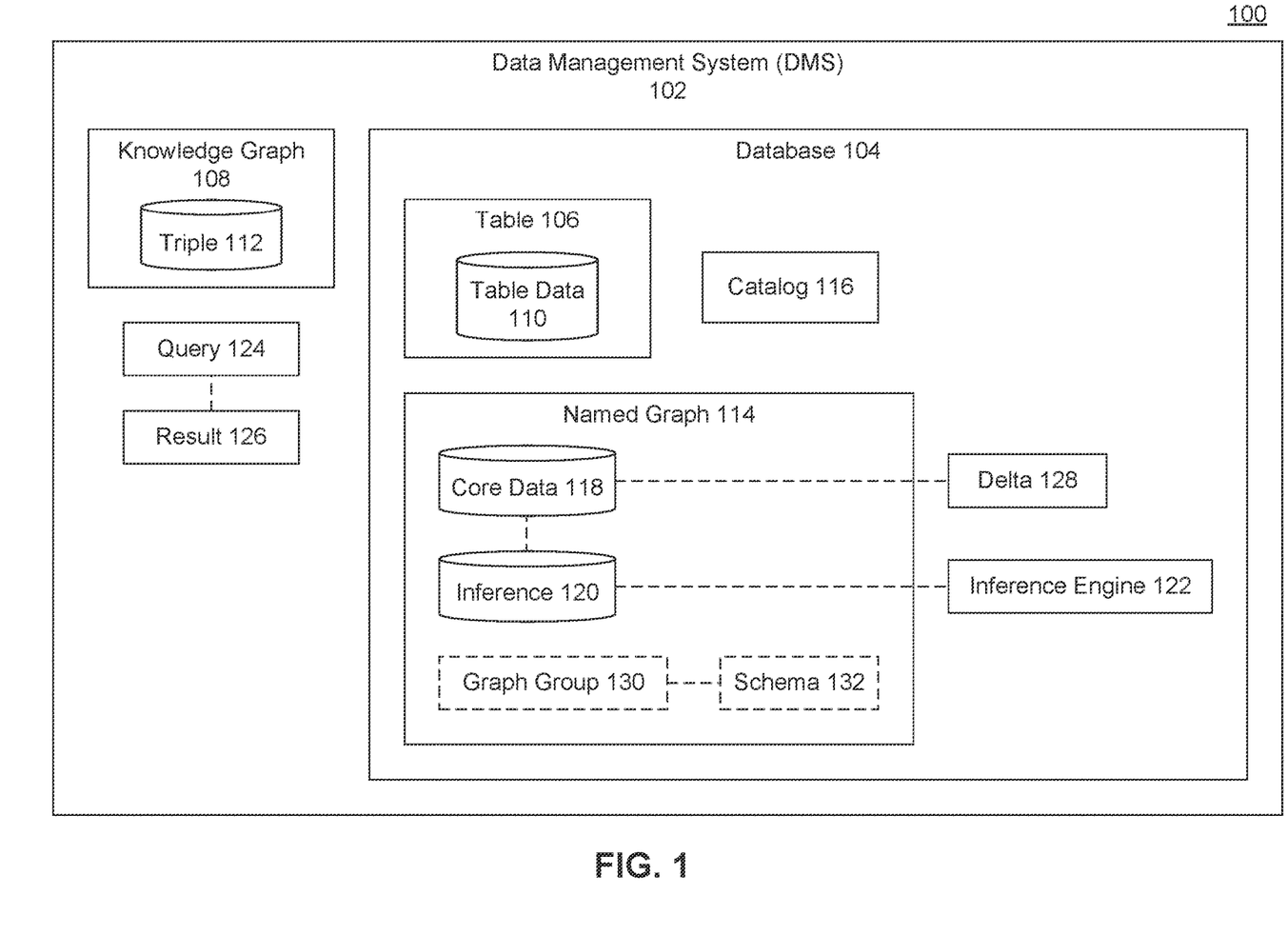
FIG. 1 is a block diagram illustrating a data management system (DMS), according to some example embodiments.

FIG. 1 is a block diagram 100 illustrating a data management system (DMS) 102, according to some example embodiments. In some aspects, DMS 102 may manage a database 104 that includes data imported in two different data formats: as table data 110 and as triples 112, and stored in database 104.

In some aspects, database 104 may include a relational database. Table 106 may be a relational table, which includes table data 110. The table data 110 may include data that is organized in rows and columns. For example, each row may correspond to a new record, and each column may include values or attributes for that record.

Knowledge graph 108 may include data but also stores relationships between the data. The data of a knowledge graph 108 may be stored as a triple 112. A triple 112 may include three pieces of data: a subject, an object, and a predicate that defines a relationship between the subject and object. An example triple 112 may be: London cityin UK. This triple 112 may indicate that London is a city located in the UK. Unlike table data 110 in which each column may standalone as part of record, data of a triple 112 may be interdependent.

Because of the variance in the structures of a knowledge graph 108 and a table 106, knowledge graphs 108 cannot be directly stored by a database 104. DMS 102 may provide systems and architecture that allow database 104 to store both table data 110 across one or more tables 106, and data that is received as a triple 112.

In some aspects, DMS 102 may provide or generate a named graph 114 which may be a specialized structure used to store data that is received in the format of a triples 112 or from a knowledge graph 108. In some aspects, a named graph 114 may include a table 106 that has been configured with columns that are designed to store data received or extracted from one or more knowledge graphs 108, that is particularly configured to store data received as a triple 112.

In some aspects, named graph 114 may include a subject column, a predicate column, and multiple object columns. In some aspects, each of the object columns may correspond or map to a different datatype. Example datatypes include integers, real numbers, strings, Booleans, floating point, and other specialized or object-based types of data. Greater details on how a knowledge graph 108 may be stored as a named graph 114 or specially-configured table 106 in a database 104 are provided in U.S. patent application Ser. No. 17/893,592 titled "Storing and Querying Knowledge Graphs in Column Stores" to Bensberg et. al., filed on Aug. 23, 2022, which is hereby incorporated by reference in its entirety.

Named graph 114 may include a specialized table of database 104 that is configured to store data organized in triples 112 and corresponding to a particular knowledge graph 108. In some aspects, different knowledge graphs 108 may be mapped to different named graphs 114. In some aspects, named graph 114 may include its own name (similar to how a table may be named), and its name may be stored in a database catalog 116. In some aspects, database catalog 116 may include metadata in which definitions of database objects such as tables, views, indexes, user groups, and named graphs 114 are stored.

In some aspects, named graph 114 may include or store two different types of data: core data 118 and inferences 120. Core data 118 may include data that is directly input or retrieved from one or more triples 112 or a turtle file that stores triples 112. The core data 118 may be input by a user and/or retrieved or received directly from a data source or set of data files. In the example above, the core data 118 may include London (subject), cityin (predicate), and UK (object).

Inferences 120 may include data that is derived from the core data 118, but which may not appear directly in a triple 112 or knowledge graph 108. In some aspects, an inference 120 may include data is derived from combining two or more triples 112, which may be stored as part of core data 118. For example, core data 118 may include two triples 112: Seattle cityin Washington, and Seahawks footballteamof Seattle. Based on this core data 118, an inference engine 122 may generate an inference that the Seahawks footballteamof Washington.

In some aspects, inference engine 122 may generate an inference 120 by detecting an identified value as being both the subject or object of a first triple 112 stored in core data 118, and the subject or object of a second triple 112 stored in core data 118. In the example above, inference engine 122 may identify Seattle in both the first triple and second triple to generate the inference 120.

One of the advantages of generating inferences 120 is that query processing is able to be performed faster than if there were no inferences. For example, a query 124 may ask "In what state is the football team of the Seahawks located?" Based on the generated inference 120 above, database 104 may quickly generate the result 126 "Washington". However, without the inference 120, conventional query processing may require the database to first identify that the Seahawks are located in Seattle, and then identify in which state Seattle is located, which would take additional time and processing resources.

As the number of queries 124 to be processed increases, the time to process each query 124 (e.g., in the absence of materialized inferences 120) may exponentially increase thus slowing down system throughput and using additional processing resources during run-time. This use of additional resources is further magnified if multiple queries 124 rely on the same inference 120 to be generated over-and-over again during run-time. For example, a second query 124 may be "What are all the football teams in Washington state?" Without generating the materialized inference 120, the database 104 would have to perform duplicative additional processing in responding to both the first query 124 and second query 124. DMS 102 may improve the speed of query processing and reduce the time and computing resources required to execute queries by storing and managing inferences 120.

However, one of the technological challenges that arise with inferences 120 is that they may become wrong or incorrect if the underlying core data 118 changes and thus cannot be relied upon when executing queries 124. For example, if the Seahawks moved from Seattle to Los Angeles, the core data 118 would be updated to Seahawks footballteamof Los Angeles and the inference 120 that the Seahawks are the footballteamof Washington would be incorrect, based on the change to the core data 118. DMS 102 may manage the data of a named graph 114 including both core data 118 and inferences 120 in ways such as to ensure consistency between inferences 120 and core data 118 when core data 118 is changed as indicated by delta 128, and allowing for accurate query 124 processing.

Delta 128 may include any changes to core data 118, such as add, delete, or modify statements. In some aspects, delta 128 may include a log of multiple changes to one or more records of core data 118. The changes indicated by delta 128 may be received from new data or a new knowledge graph 108 being imported into database 104, from a user via a user interface, or from another system.

In some aspects, a change to core data 118 may not be processed or implemented immediately. Instead, DMS 102 may wait for a period of time, until a threshold number of transactions or changes have been logged, or until receiving a change signal from a user before implementing or applying the changes logged in delta 128. Grouping the changes of delta 128 may help improve processing times by batching updates to core data 118, rather than continually pausing the processing of queries 124 to update core data 118 and inferences 120 each time a change is received by delta 128.

In some aspects, DMS 102 may ignore the underlying records of core data 118 for which a change command (add, modify, delete) has been received in delta 128 but not yet processed. In some aspects, DMS 102 may also disregard or ignore inferences 120 that are impacted by delta 128 when processing queries 124 while there are changes in delta 128 that have not been implemented in core data 118.

In some aspects, inference engine 122 may track which inferences 120 rely on which records of core data 118, and if any of those relied upon records are impacted with a change in delta 128, only those inferences 120 may be flagged, deleted, and/or ignored until the underlying core data 118 has been updated.

Figure 2A:
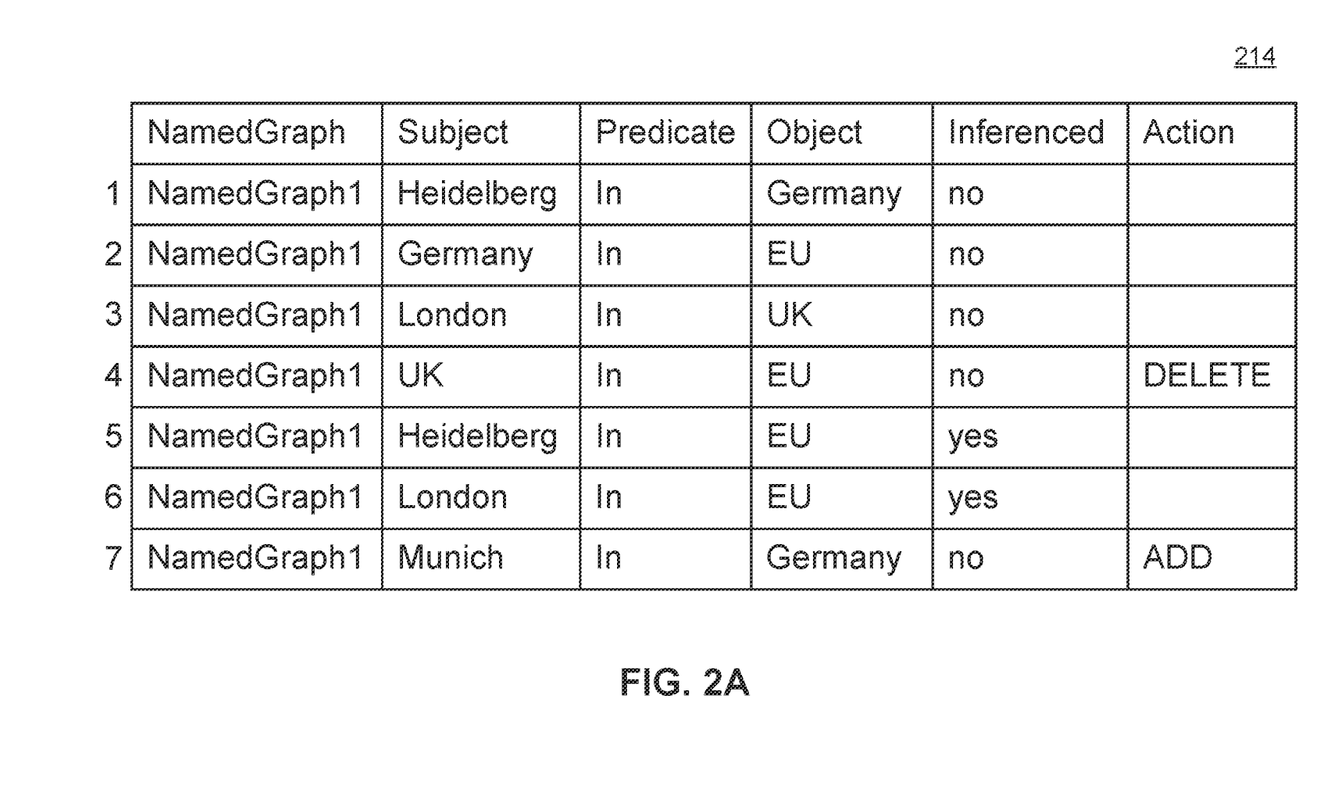
FIG. 2A illustrates an example named graph, according to some example embodiments.

FIG. 2A illustrates an example named graph 214, according to some example embodiments. As illustrated, the named graph 214 (which is an example of named graph 114) may include a subject, predicate, and object column. In the example illustrated, a single object column is illustrated (which includes strings), but in other aspects, the named graph 214 may include multiple object columns. For example, named graph 214 may include a new triple 112 London Population 8.9 M, and 8.9 M may be in a different object column for integers or real numbers.

In some aspects, named graph 214 may include an inference flag or inferenced column. In some aspects, the inferenced column may include a binary value indicating whether or not the record is an inference of two or more records from core data 118. In the example illustrated, for the record 6 "London in EU", the inference flag is set to yes (or may be set to 1 in other aspects). This may indicate that the record 6 was derived from two or more core data records 118. In the example illustrated, record 6 may have been derived from records 3 and 4.

In some aspects, the inferenced column may indicate from which record(s), the inference was drawn or generated. For example, core data records 118 may include a NULL value in the inferenced column, while records which are inferences 120 may include two numbers or a pair indicating the two records from which the inference 120 was generated. In the example above, instead of 'yes', record 6 may include the pair (3, 4). In some aspects, the inference pair may be separated into two different columns (the first column may indicate record 3, the second column may indicate record 4). For core data records 118, the values in both columns may be NULL. Thus the existence of a non-NULL value may operate as an inference flag in either column.

In some aspects, named graph 214 may include an action column. Action column may indicate what action (e.g., from delta 128) is to be performed or that is logged for the row or triple. In the example illustrated, only two actions Delete and Add are illustrated. In some aspects, an additional action of Modify could be used indicating which column of the triple is to be modified, and what the new value should be.

If a query 124 is executed against the named graph 214, asking for a list of cities in the EU, DMS 102 may ignore any records including an ADD action which has not yet been processed and include records with a DELETE flag (as the deletion has not yet taken place). In some aspects, DMS 102 may only ignore those records that indicate a delete or modify action. In some aspects, DMS 102 may also ignore any records which are derived from or inferences 120 of those underlying records (e.g., for which unprocessed actions are logged in delta 128). As such, in the example illustrated, query processing may ignore record 4 which indicates a delete action and 6 (which is an inference 120 relying on record 4).

In some aspects, DMS 102 may include as part of query processing records that are being added to the named graph 214. As such, the result of the query 124 requesting the list of cities in the EU may include Heidelberg (e.g., as derived from record 5). If DMS 102 is accounting for added records (e.g., that include ADD in the action column), then inference engine 122 may generate a new inference 120 (not shown) as part of query processing in which Munich is in the EU (e.g., based on records 7 and 2), and return both Heidelberg and Munich as a result 126 of the query 124.

Figure 2B:
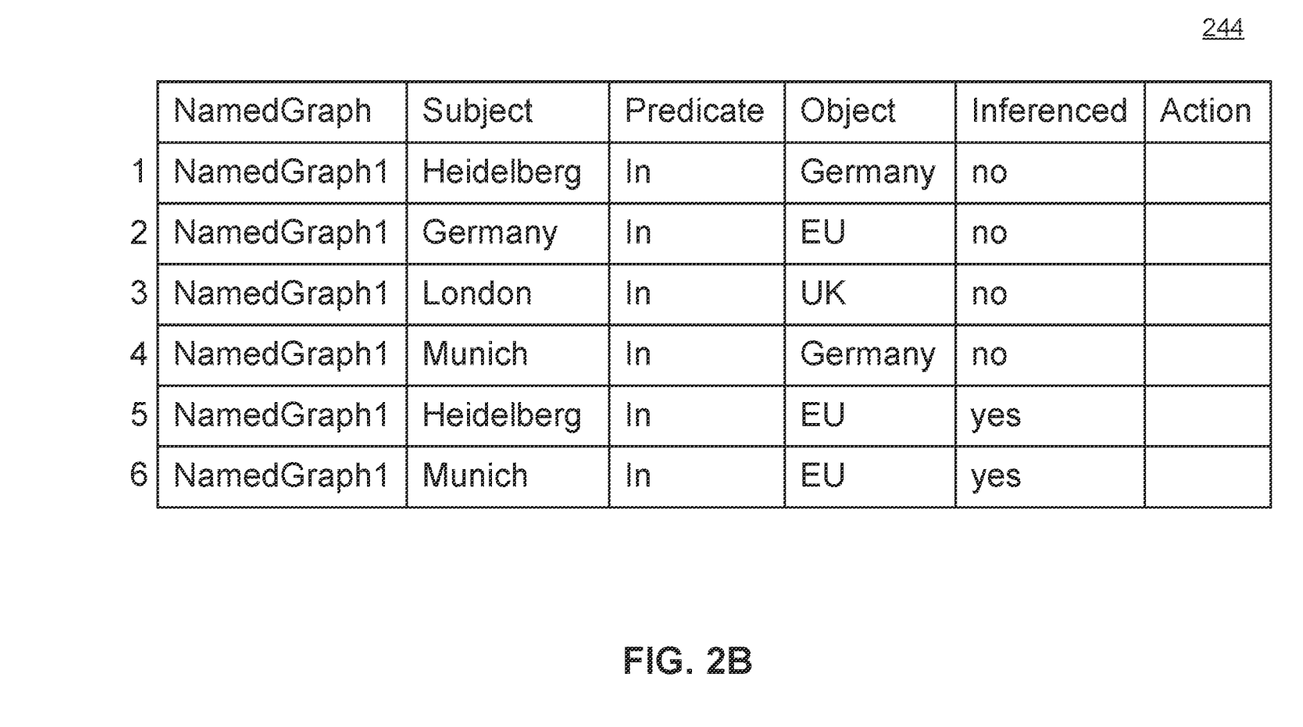
FIG. 2B illustrates an example of the named graph that has been updated based on delta, according to some example embodiments.

FIG. 2B illustrates an example of the named graph 214 that has been updated based on delta 128, according to some example embodiments. In the example named graph 244 illustrated, the record 4 was deleted in accordance with the action column as was the corresponding inference record 6. The new record 7 (e.g., from named graph 214) now appears as record 4, and the new inference generated by inference engine 122 is now record 6.

In some aspects, when executing the actions of delta 128, DMS 102 may first delete all the inferences 120 and update the core data records 118 based on the action column. In some aspects, DMS 102 may only delete those inferences 120 that were flagged as relying on a core data 118 record that was changed by delta 128.

In some aspects, inference engine 122 may then rebuild new inferences 120 based on the updated core data 118 prior to processing new or additional queries 124. In some aspects, inference engine 122 may generate inferences 120 during query processing and save those newly generated inferences to named graph 244, so that they may be used by subsequent queries 124.

Returning to FIG. 1, in some aspects, DMS 102 may generate or include a graph group 130 and a schema 132 associated with named graph 114. In some aspects, a database 104 may include thousands or even millions of named graphs 114 based on different knowledge graphs 108 which may have been imported. It would be cumbersome or involve too much computational overhead to the database 104 to store each named graph 114 in catalog 106, and would destroy the utility of the catalog 106. Moreover, applications may want create new Named Graphs by means of the INSERT statement rather than a CREATE NAMED GRAPH statement. One difference is that an INSERT statement belongs to the group of statements referred to as Data Manipulation Language (DML), whereas a CREATE NAMED GRAPH statement would be Data Definition Language (DDL) in the Database 104. For DDL statements, higher locking requirements exist that may affect the overall throughput of Database 104. Therefore, for some use cases, it may be advantageous to treat Named Graphs 114 as a light-weight concept, expressed technically as a value in a column—as data—rather than as a dedicated entry in the catalog—as metadata.

As such, DMS 102 may provide for or allow a user to generate one of graph groups 130. A graph group 130 may be a group of named graphs 114 that share or may be associated with a schema 132 in the catalog 116. In some aspects, schema 132 may be a catalog schema. In some aspects, tables, named graphs, and graph groups may all live in or share one or more catalog schemas. In some aspects, the various member named graphs 114 of a graph group 130 may all be related to a particular subject (e.g., such as biology, sports, Europe, etc.). In some aspects, to identify a particular named graph 114 would require a full path indicating schema 132, graph group 130, and name of the named graph 114.

Figure 3:
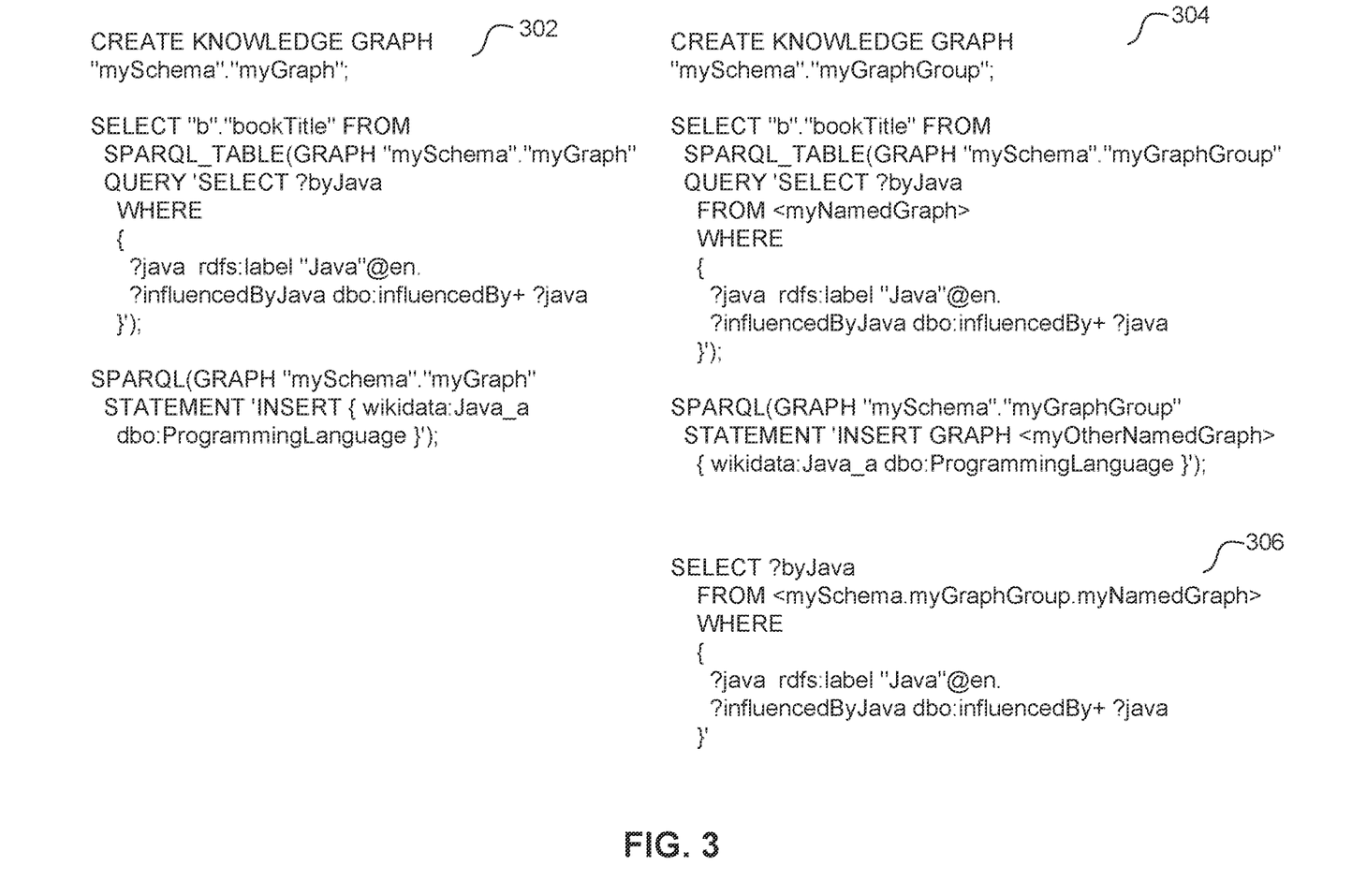
FIG. 3 is an example illustrating the use of a graph group, according to some embodiments.

FIG. 3 is an example illustrating the use of a graph group 130, according to some embodiments. Section 302 illustrates example SPARQL Protocol and RDF Query Language (SPARQL) code without the use of a graph group 130. As indicated above, without graph groups 130, the catalog 116 could very quickly become flooded with the names of millions of named graphs 114. SPARQL is an example of an RDF (resource description framework) query language that may be used to retrieve and manipulate data stored as triples 112 (e.g., or in a named graph 114 of database 104).

Section 304 illustrates an example of how a graph group 130 may be used in SPARQL. For example, the SPARQL_TABLE function may include two parameters both a schema 132 (e.g., mySchema) and a graph group 130 (e.g., myGraphGroup), instead of the schema name and name of the named graph as illustrated in the SPARQL_TABLE function of section 302. Then, for example, in section 304, the query may include a FROM clause identifying the named graph 114 (e.g., myNamedGraph). Section 306 illustrates how the graph group 130 functionality may be used by a SPARQL endpoint, or outside system that wants to execute a SPARQL query. One advantage of the SPARQL_TABLE and SPARQL functions is that the catalog entity, here "mySchema". "myGraphGroup" is named explicitly in a parameter. This allows an easy way of checking authorizations or permissions, etc. for the specified artifact.

Figure 4:
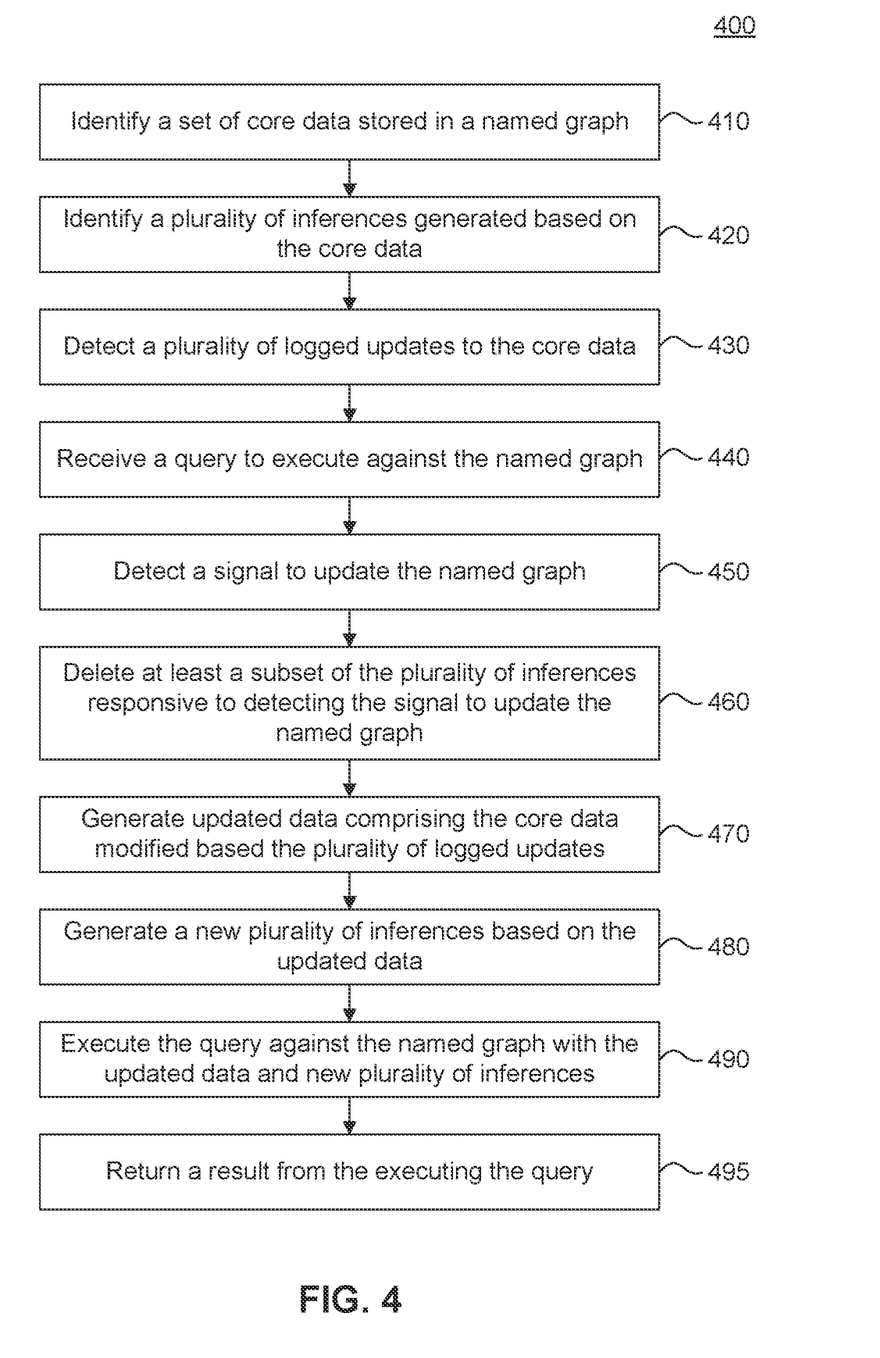
FIG. 4 is a flowchart illustrating a process for a data management system (DMS), according to some embodiments.

FIG. 4 is a flowchart 400 illustrating a process for a data management system (DMS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, a set of core data stored in a named graph is identified. For example, DMS 102 may identify core data 118 in named graph 114. In some aspects, as illustrated in named graph 214, any data for which the inference flag is not set may be identified as core data 114.

In 420, a plurality of inferences generated based on the core data are identified. For example, DMS 102 may identify inferences 120 in named graph 114. In some aspects, as illustrated in named graph 214, any data for which the inference flag is set may be identified as an inference 120. In some aspects, the named graph 214 may indicate from which records the inference 120 was derived or generated.

In 430, a plurality of logged updates to the core data are detected. For example, DMS 102 may receive edit commands from a user or another system identifying one or more records of core data 118 that are to be updated. These edit commands may be captured as delta 128. In some aspects, named graph 214 may include a column indicating which records of core data 118 are to be updated, and what action is to be performed on the records.

In 440, a query is received to execute against the named graph. For example, DMS 102 may receive a query 124 to execute against named graph 114.

In 450, a signal to update the named graph is detected. For example, a user may provide a command requesting that named graph 114 is updated based on delta 128. In some aspects, DMS 102 may perform an update based on delta 120 once a threshold plurality of actions have been logged, or periodically every X number of minutes. In other aspects, named graph 114 may be updated in real-time with the receipt of each new action or delta 128.

In 460, at least a subset of the plurality of inferences are deleted responsive to detecting the signal to update the named graph. For example, DMS 102 may delete only a subset of inferences 120 based on which inferences relied upon an updated record from core data 118. For example, if a particular record from core data 118 is updated (e.g., deleted or modified), then any inferences 120 that are identified as relying on the particular record may be deleted from named graph 114. In some aspects, DMS 102 may delete all of the inferences 120 as part of updating the named graph 114.

In 470, updated data comprising the core data modified based the plurality of logged updates is generated. For example, DMS 102 may incorporate changes from delta 128 (or the action column of named graph 214) into the named graph 114.

In 480, a new plurality of inferences are generated based on the updated data. For example, inference engine 122 may generate a new set of inferences 120 based on which records of core data 118 were updated by the application of delta 128. In some aspects, if all the inferences 120 were deleted in step 450, then all new inferences 120 may be generated by inference engine 122.

In some aspects, the new inferences 120 may be generated prior to query processing and/or during query processing. In some aspects, a user may select or flag one or more core data records 118 that are important or that are identified as 'hot data' or frequently used data and inference engine 122 may generate inferences 120 for the hot data prior to query processing, and generate/store additional inferences on other data 118 that were created as part of processing a query 124.

In 490, the query is executed against the named graph with the updated data and new plurality of inferences. For example, database 104 may execute the query 124 against the updated named graph 244.

In 495, a result from the executing the query is returned. For example, DMS 102 or database 104 may generate a result 126 from the query 124 and provide the result to a requesting or identified person or system. In some aspects, the result 126 may be displayed for a user.

Figure 5:
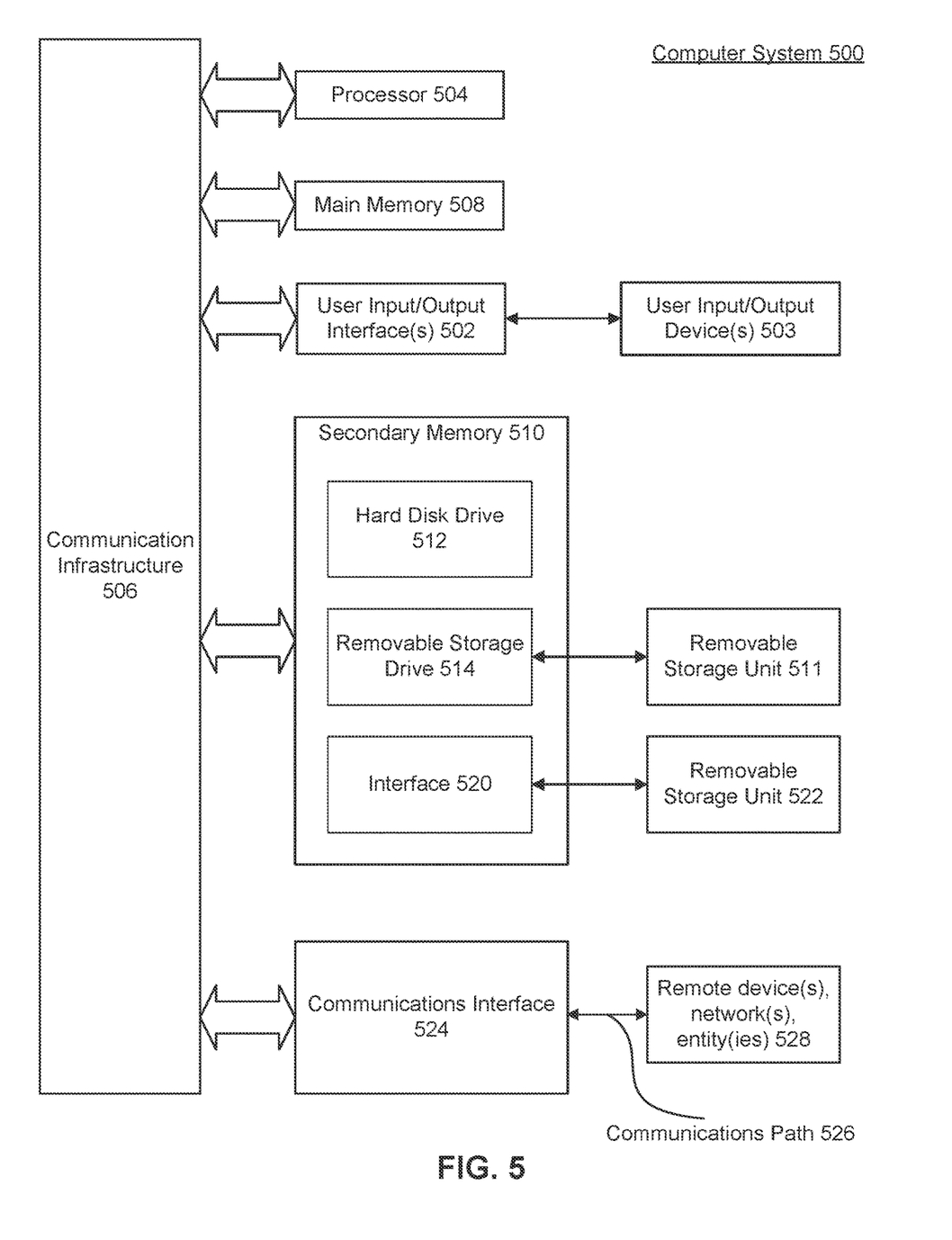
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments, and/or any combination or sub-combination thereof.

Computer system 500 includes one or more processors (also called central processing units, or CPUs), such as a processor 504. Processor 504 is connected to a communication infrastructure or bus 506. Computer system 500 may represent or comprise one or more systems on chip (SOC).

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, memory card, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a data management system, comprising:
   identifying a set of core data stored in a named graph, wherein the core data comprises a triple including a predicate;
   identifying a plurality of inferences generated based on the core data, wherein the plurality of inferences identify relationships derived from the set of core data and not included in the core data;
   detecting a plurality of logged updates to the core data, wherein one or more of the logged updates affects one or more of the plurality of inferences, and wherein one or more entries of core data corresponding the one or more of the plurality of logged updates are skipped during an execution of an initial query performed prior to generating updated data;
   receiving a query to execute against the named graph;
   detecting a signal to update the named graph;
   deleting at least a subset of the plurality of inferences responsive to detecting the signal to update the named graph;
   generating the updated data comprising the set of core data modified based on the plurality of logged updates;
   generating, after the deleting, a new plurality of inferences based on the updated data;
   executing the query against the named graph with the updated data and the new plurality of inferences; and
   returning a result from the executing the query.

2. The method of claim 1, wherein the set of core data comprises data stored in a knowledge graph.

3. The method of claim 2, wherein the knowledge graph comprises data stored as a triple comprising a subject, object, and predicate defining a relationship between the subject and the object.

4. The method of claim 1, wherein the named graph includes an inference flag indicating which entries in the named graph comprise one of the plurality of inferences.

5. The method of claim 4, wherein the deleting comprises:
   identifying the plurality of inferences based on the inference flag; and
   deleting the entries for which the inference flag is set.

6. The method of claim 1, wherein the named graph includes an action column indicating which entries in the named graph include logged updates.

7. The method of claim 6, wherein the action column indicates whether an add or delete update is to be performed on a respective column of core data.

8. The method of claim 7, further comprising:
   receiving an initial query prior to the receiving the signal; and
   executing the initial query against the named graph comprising the set of core data, wherein one or more entries of core data including a logged update are skipped during the executing of the initial query.

9. The method of claim 1, wherein the detecting the signal comprises:
   determining that the signal comprises one of a threshold number of transactions have been logged prior to generating the updated data.

10. A system comprising at least one processor, the at least one processor configured to perform operations comprising:
    identifying a set of core data stored in a named graph, wherein the core data comprises a triple including a predicate;
    identifying a plurality of inferences generated based on the core data, wherein the plurality of inferences identify relationships derived from the set of core data and not included in the core data;
    detecting a plurality of logged updates to the core data, wherein one or more of the logged updates affects one or more of the plurality of inferences, and wherein one or more entries of core data corresponding the one or more of the plurality of logged updates are skipped during an execution of an initial query performed prior to generating updated data;
receiving a query to execute against the named graph;
detecting a signal to update the named graph;
deleting at least a subset of the plurality of inferences responsive to detecting the signal to update the named graph;
generating updated data comprising the set of core data modified based on the plurality of logged updates;
generating, after the deleting, a new plurality of inferences based on the updated data;
executing the query against the named graph with the updated data and the new plurality of inferences; and
returning a result from the executing the query.

11. The system of claim 10, wherein the set of core data comprises data stored in a knowledge graph.

12. The system of claim 11, wherein the knowledge graph comprises data stored as a triple comprising a subject, object, and predicate defining a relationship between the subject and the object.

13. The system of claim 10, wherein the named graph includes an inference flag indicating which entries in the named graph comprise one of the plurality of inferences.

14. The system of claim 13, wherein the deleting comprises:
identifying the plurality of inferences based on the inference flag; and
deleting the entries for which the inference flag is set.

15. The system of claim 10, wherein the named graph includes an action column indicating which entries in the named graph include logged updates.

16. The system of claim 15, wherein the action column indicates whether an add or delete update is to be performed on a respective column of core data.

17. The system of claim 16, the operations further comprising:
receiving an initial query prior to the receiving the signal; and
executing the initial query against the named graph comprising the set of core data, wherein one or more entries of core data including a logged update are skipped during the executing of the initial query.

18. A non-transitory computer-readable medium having instructions stored thereon that, when executed by at least one computing device, cause the at least one computing device to perform operations comprising:
identifying a set of core data stored in a named graph, wherein the core data comprises a triple including a predicate;
identifying a plurality of inferences generated based on the core data, wherein the plurality of inferences identify relationships derived from the set of core data and not included in the core data;
detecting a plurality of logged updates to the core data, wherein one or more of the logged updates affects one or more of the plurality of inferences, and wherein one or more entries of core data corresponding the one or more of the plurality of logged updates are skipped during an execution of an initial query performed prior to generating updated data;
receiving a query to execute against the named graph;
detecting a signal to update the named graph;
deleting at least a subset of the plurality of inferences responsive to detecting the signal to update the named graph;
generating updated data comprising the set of core data modified based on the plurality of logged updates;
generating, after the deleting, a new plurality of inferences based on the updated data;
executing the query against the named graph with the updated data and the new plurality of inferences; and
returning a result from the executing the query.

19. The non-transitory computer-readable medium of claim 18, wherein the set of core data comprises data stored in a knowledge graph, wherein the knowledge graph comprises data stored as a triple comprising a subject, object, and predicate defining a relationship between the subject and the object.

20. The non-transitory computer-readable medium of claim 18, wherein the named graph includes an inference flag indicating which entries in the named graph comprise one of the plurality of inferences.

* * * * *